Figure 1:
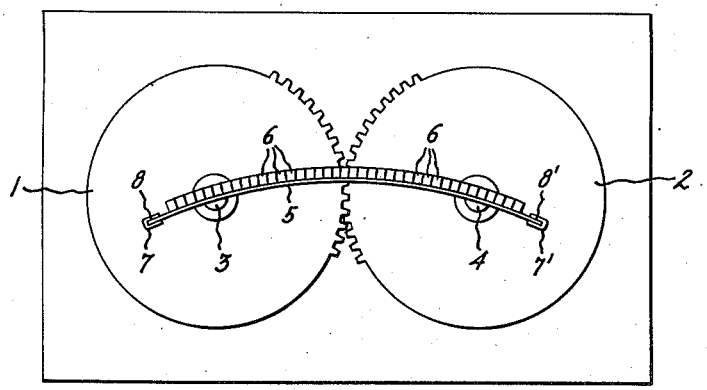

Feb. 27, 1951 S. HANSEN 2,543,630
X-RAY MONOCHROMATOR
Filed April 12, 1950

Inventor:
Siegfried Hansen,
by Paul A. Frank
His Attorney.

Patented Feb. 27, 1951

2,543,630

UNITED STATES PATENT OFFICE 2,543,630

X-RAY MONOCHROMATOR

Siegfried Hansen, Los Angeles, Calif., assignor to General Electric Company, a corporation of New York Application April 12, 1950, Serial No. 155,438

3 Claims. (Cl. 250—53)

This invention relates generally to monochromators, which are devices for separating a single wavelength from a heterogeneous radiation.

In the study of materials and their properties, it is well known that a given material may be irradiated by primary rays or charged particles such that it will emit a fluorescent radiation. This fluorescent radiation is characteristic of the material in that it is composed of X-rays having certain wavelengths and intensity ratios which are always the same for a given material irradiated by a given source. A plot of intensity versus wavelength of fluorescent X-rays is commonly known as the "fluorescent X-ray spectrum" of the material and may be used as a means of identifying or analyzing the material.

A problem in utilizing the above-described properties of X-rays lies in the difficulty of obtaining fluorescent radiations of sufficient intensity to permit facile detection. Much of the intensity of the irradiating or primary beam is expended in the phenomena of "scattering" and even though a relatively intense primary beam is employed, the fluorescent radiation does not attain an intensity which is readily observed. Furthermore, since the intensities of the component wavelengths must be individually measured to obtain a fluorescent X-ray spectrum, additional intensity depleting factors may be introduced by the means adopted for separating the spectrum into its components.

A means which has been suggested whereby the fluorescent X-ray radiation may be monochromatized is by diffraction with a bent crystal. This bent crystal may also be used to focus one wavelength of the fluorescent X-ray spectrum at a relatively defined spot, and, in a practical application such, for example, as a spectrometer, a detector may be located at this spot to secure the advantage of the increased intensity. In this way, the optical efficiency of the system is improved because focusing of a particular wavelength of the fluorescent X-ray spectrum on the detector employs other rays emanating from the material than those paraxial rays which are the only rays employed in a simple crystal type monochromator.

The particular wavelengths which are focused and detected at any one time depend upon the relative position of the material under study with respect to the detector, and upon the position and curvature of the bent crystal. Heretofore, the spectrum has been obtained by employing a crystal having a fixed curvature and moving the crystal and the detector with respect to the material and to each other such that the requisite focusing relations are maintained for each of the wavelengths to be measured. This necessarily results in the detectors approaching the crystal as the spectrum is traversed with the consequences that the focusing becomes less effective, and scattered primary radiation gives spurious signals to the detector. Accordingly, it is a principal object of this invention to provide an improved mechanically advantageous bent crystal type of monochromator which is capable of realizing a high degree of resolution with high optical efficiency.

A further object of this invention is to provide a bent crystal type of monochromator which effectively employs a circularly bent crystal, the radius of which is easily adjusted.

In the attainment of the foregoing objects, an important feature of this invention resides in the provision of a flexible member upon which a plurality of crystal strips are contiguously positioned or perhaps a single flexible crystal is positioned. The flexible member is so fastened at a point on each of a pair of intermeshed circular gears that the member forms an arc of a circle and rotation of the gears results in a change of the radius of curvature of the flexible member. Because in the case of a plurality of strips each of the crystals is individually attached to the flexible member, they effectively present a bent crystal surface to any rays striking them.

For additional objects and advantages, and for a better understanding of the invention, attention is now directed to the following description and accompanying drawing, and also to the appended claims in which the features of the invention believed to be novel are particularly pointed out. In the drawing, Fig. 1 is a plan view of an X-ray monochromator, and Fig. 2 is another view of the same machine.

Referring to Fig. 1, there is shown a pair of circular gears 1 and 2, which are intermeshed and pivoted on shafts 3 and 4 such that their faces lie in the same planes. Attached to one face of the gears 1 and 2 is a pair of slotted upright members 7 and 7'. Into the slots 8 and 8' of members 7 and 7' are fitted the ends of a flexible member 5, and a plurality of crystals 6 are mounted side by side along member 5. Members 7 and 7' are fastened to the faces of gears 1 and 2 at points which are at a distance of one-half the gear radius from the center of the gear. It may be shown mathematically that if a thin flexible member be attached to the faces of two meshing gears in the manner indicated, rotation of the gears will bend the member in true circular curvature. Crystals 6 which are cut in the shape of narrow strips also are arrayed in an approximation of the circular curvature of flexible member 5 and the radius of this curvature may be varied by rotation of the gears. Consequently, crystals 6 which appear substantially as a single circularly curved crystal may be used to monochromatize and focus the selected wavelength from a fluorescent X-ray radiation at a determinable spot.

Figure 2:
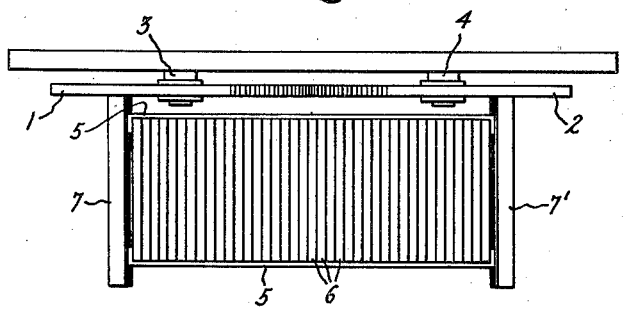

Referring to Fig. 2, it can be seen that crystal strips 6 are only partially covered by flexible member 5, and it is the uncovered portion of the crystals which is used as a crystal lens. The greater the number of crystal strips 6 for a given length of flexible member 5, the more nearly will this crystal array approximate a single circularly bent crystal. This type of monochromator focusing means has an advantage over the prior types because of its simplicity and the facility of its adjustment. In apparatus such as spectrophotometers and spectrometers employing this type of monochromator, the detector need not approach the crystal of the monochromator as the spectrum is traversed. In spectrometers employing a movable type detector, focusing of the monochromatized radiation becomes less effective as the detector and the monochromator approach one another, and scattered primary radiation gives spurious signals to the detector. Therefore, a high degree of resolution is provided for by this type of monochromator, and the minimum indication from scattered primary radiation is recorded by a detector in a spectrometer employing this device.

While certain specific embodiments have been shown and described, it will, of course, be understood that various modifications may be made without departing from the invention. For example, a single lamina of flexible crystal, such as mica, may replace the plurality of crystal strips 6, if the particular application allows a sufficiently flexible crystalline substance to be employed. The appended claims are, therefore, intended to cover any such modifications within the true spirit and scope of the invention.

What I claim as new and desire to secure by Letters Patent of the United States is:

1. In combination, a pair of intermeshed circular gears having equal radii, a pair of upright members, one member being attached to a face on one of said gears at a distance of one-half the gear radius from the center of said gear and other said upright member being similarly attached to other said gear, said points of attachment being on radii of said gears which are symmetrically positioned about a line tangent to both gears at the intermeshing point, and said gear faces to which said members are attached being in the same plane, a pair of flexible members being attached to said upright members, whereby said flexible members form the arc of a pair of circles whose radii are adjustable by rotation of the gears.

2. An apparatus for selecting and focusing a single wavelength of radiation within the X-ray spectrum at a determinable position, comprising a pair of intermeshed circular gears having equal radii, a pair of upright members each being fastened at one end to the face of a different one of said gears, said point of fastening being at a distance of one-half the gear radius from the center of said gears, said faces to which said upright members are attached being positioned in the same plane and said points of attachment being on radii of said gear faces, said radii being symmetrically positioned about a line tangent to said gears at the intermeshing point, a first flexible member being attached at its ends to each of said upright members, a second flexible member being attached at its ends to each of said upright members at a distance from said first member, said members being positioned such that they are parallel and lie in separate planes which are perpendicular to the plane of said upright members, and a multiplicity of crystals being contiguously mounted on said flexible members, each of said flexible members extending over a small portion of each of said crystal strips whereby rotation of said gears causes said strips to assume the arc of a circle having an adjustable radius.

3. In apparatus for selecting and focusing a single wavelength of radiation within the X-ray spectrum at a determinable position, a pair of intermeshed circular gears having equal radii, a pair of upright members each being fastened at one end to the face of a different one of said gears, said point of fastening being at a distance of one-half the gear radius from the center of said gears, said faces to which said upright member is attached lying positioned in the same plane and said points of attachment being on radii of said gear faces which are located symmetrically about a line tangent to each of said gears at the point of intermeshment, a first flexible member being attached at its ends to each of said upright members, a second flexible member being attached at its ends to each of said upright members at a distance from said first member, said flexible members being positioned such that they are parallel and lie in separate planes which are perpendicular to the plane of said upright members, and a plurality of crystal strips being contiguously located on said flexible members, each of said flexible members extending over a small portion of each of said crystal strips.

SIEGFRIED HANSEN.

REFERENCES CITED

The following references are of record in the file of this patent:

UNITED STATES PATENTS

| Number | Name | Date |
|---|---|---|
| 753,351 | Beidler | Mar. 1, 1904 |
| 840,084 | Muller | Jan. 1, 1907 |
| 1,865,441 | Mutscheller | July 5, 1932 |
| 1,951,404 | Goddard | Mar. 20, 1934 |
| 2,497,543 | Frevel | Feb. 14, 1950 |

OTHER REFERENCES

Focusing X-Ray Monochromators, by C. S. Smith, Review of Scientific Instruments, June 1941, pp. 312-314.